United States Patent
Osborne et al.

(10) Patent No.: US 10,730,250 B2
(45) Date of Patent: Aug. 4, 2020

(54) CAUL PLATES AND RELATED METHODS

(71) Applicant: The Boeing Company, Chicago, IL (US)

(72) Inventors: Max M. Osborne, Brighton (AU); Matthew Suter, Ferntree Gully (AU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/152,987

(22) Filed: Oct. 5, 2018

(65) Prior Publication Data

US 2020/0108571 A1    Apr. 9, 2020

(51) Int. Cl.
*B29C 70/54*    (2006.01)
*B29C 70/34*    (2006.01)

(52) U.S. Cl.
CPC ............ *B29C 70/54* (2013.01); *B29C 70/342* (2013.01)

(58) Field of Classification Search
CPC .............................. B29C 70/443; B29C 70/48
See application file for complete search history.

(56) References Cited

U.S. PATENT DOCUMENTS

| | | | |
|---|---|---|---|
| 6,406,660 B1 * | 6/2002 | Spurgeon | B29C 43/12 264/138 |
| 7,334,782 B2 | 2/2008 | Woods et al. | |
| 8,083,984 B2 * | 12/2011 | Millar | B29C 70/54 264/277 |
| 8,940,213 B2 | 1/2015 | Lockett et al. | |
| 9,682,514 B2 | 6/2017 | Lockett et al. | |
| 9,682,516 B2 | 6/2017 | Lockett et al. | |
| 2011/0121487 A1 * | 5/2011 | Topping | B29C 70/48 264/258 |
| 2016/0375631 A1 * | 12/2016 | Encinosa | B29C 33/26 156/91 |
| 2019/0299548 A1 | 10/2019 | Osborne et al. | |

FOREIGN PATENT DOCUMENTS

EP    2452808    5/2012

OTHER PUBLICATIONS

Reichhold, Inc., "RTM Light," 2007, available at http://www.gi-ni.net/1/images/stories/downloads/rtm_lght_page_by_page.pdf (last accessed Oct. 5, 2018), 16 pages.

* cited by examiner

*Primary Examiner* — Sing P Chan
(74) *Attorney, Agent, or Firm* — Hanley, Flight & Zimmerman, LLC

(57) ABSTRACT

Caul plates and related methods are disclosed herein. An example caul plate for use in a composite laminate layup includes a first surface and a second surface opposite the first surface. The example caul plate includes protrusions extending from the first surface. The protrusions are disposed over a tool surface of the composite laminate layup. The protrusions are to define a gap between the first surface and the tool surface to limit a thickness of a preform disposed between the tool surface and the first surface when a pressure is exerted on the second surface.

20 Claims, 7 Drawing Sheets

CAUL PLATES AND RELATED METHODS

FIELD OF THE DISCLOSURE

This disclosure relates generally to resin-infused composite structures and, more particularly, to caul plates and related methods.

BACKGROUND

A resin-infused composite structure (e.g., a laminate) can be fabricated by infusing resin into a dry fiber preform using vacuum pressure and curing the resin-infused preform. A caul plate includes rigid or semi-rigid metallic or composite plate that is placed above the preform but underneath a vacuum bag in a composite laminate layup.

Figure 1:
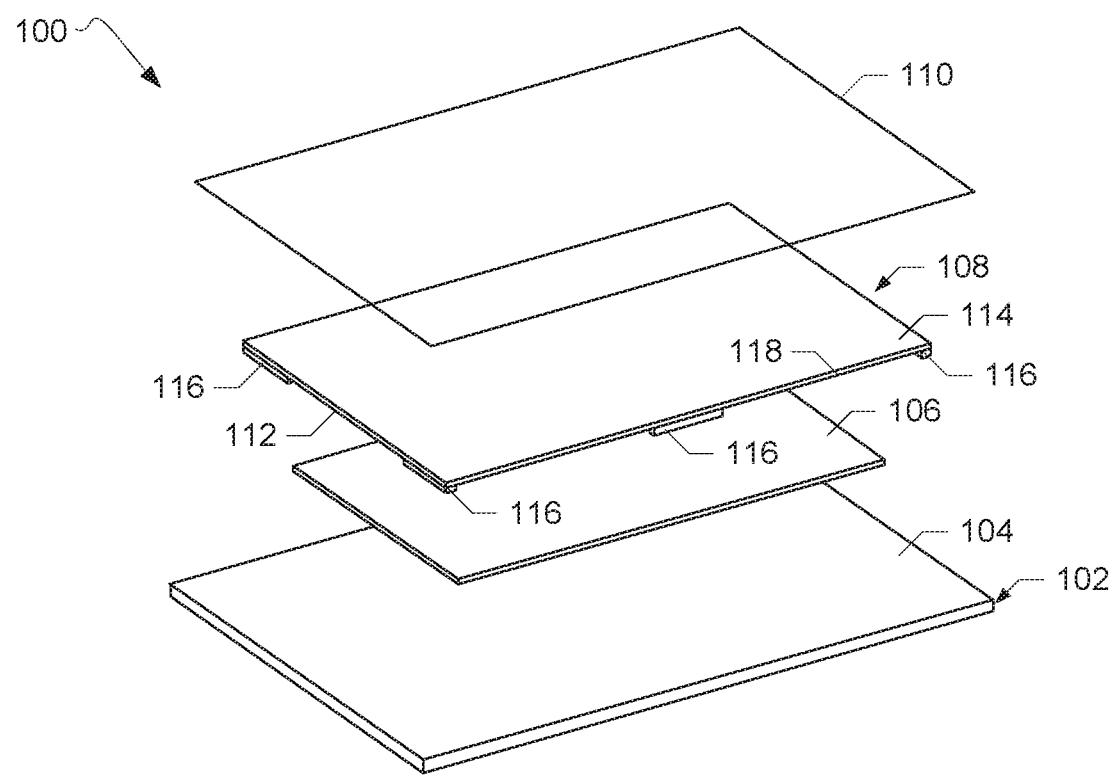
FIG. 1 illustrates an exploded view of an example composite laminate layup including an example caul plate in accordance with teachings disclosed herein.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

SUMMARY

An example caul plate for use in a composite laminate layup includes a first surface and a second surface opposite the first surface. The example caul plate includes protrusions extending from the first surface. The protrusions are disposed over a tool surface of the composite laminate layup. The protrusions are to define a gap between the first surface and the tool surface to limit a thickness of a preform disposed between the tool surface and the first surface when a pressure is exerted on the second surface.

An example apparatus disclosed herein includes a tool, a preform to be infused with resin, and a caul plate. The caul plate includes protrusions. The protrusions are disposed over a surface of tool when the caul plate is disposed over the preform. The example apparatus includes a vacuum bag having an inlet and an outlet. The vacuum bag is to be at least partially disposed over the caul plate and the preform. The protrusions of the caul plate are to control a thickness of the preform when a pressure generated between the inlet and the outlet is exerted on the caul plate during infusion of the resin into the preform.

Another example apparatus disclosed herein includes a composite structure, means for smoothing a surface of the composite structure, and means for controlling a thickness of the composite structure extending from the means for smoothing. The means for controlling is to control the thickness of the composite structure when a pressure is exerted on the means for smoothing.

DETAILED DESCRIPTION

Fabrication of a resin-infused composite structure such as a laminate includes infusing resin into a dry fiber preform using vacuum pressure and curing the resin-infused laminate. A caul plate includes a rigid or semi-rigid metallic or composite plate that is placed above the preform and at least partially underneath the vacuum bag in a composite laminate layup. The caul plate provides for a smooth surface finish (e.g., a smooth aerodynamic surface) of the cured laminate as compared to if the vacuum bag was placed in direct contact with the preform.

During a resin infusion process, resin is infused or drawn into a preform using pressure. A thickness and a fiber volume fraction of the resulting cured laminate is based on the amount of resin versus an amount of fiber materials (e.g., carbon fibers, fiberglass, Kevlar®) in the laminate. In known resin infusion processes, pressure at an outlet of a vacuum bag disposed over the preform is regulated, however inlet resin pressure is not controlled. As a result, a net compaction pressure exerted on the preform is not well controlled during the resin infusion process. Also, the amount of resin infused into the preform is not well controlled during the infusion process, which can result in increased amounts of resin being infused into the preform as compared to an amount of carbon or fiber material in the preform. The effects of uncontrolled resin pressure and/or uncontrolled amounts of infused resin include lower fiber volume fractions (e.g., an amount of carbon or other fiber material as a percentage of the laminate) and less control over a thickness of the cured laminate. Further, laminate thicknesses can be inconsistent between resin infusion processes, thereby resulting in laminates having different thicknesses relative to one another, which may be undesirable in production of component(s) including the laminates.

If a thickness of the laminate is not controlled during the fabrication process, then the mechanical performance of a structure including the laminate can be negatively affected. Variability in laminate thickness can also affect the assembly tolerances of components and require remedial steps such as shimming between interfaces involving the laminate. Failure to adequately control a thickness of the laminate during fabrication can also affect the resin infusion process or the filling of the preform with resin. For example, if the preform is overly compacted or highly pressurized during the resin infusion process, the permeability of the preform can be affected. As a result, in some examples, the resin cannot fully ingress, which can cause defects in the laminate such as areas that are starved of resin. In some other examples, the resin may infuse more slowly, which increases fabrication processing times.

Known caul plates include smooth surfaces that are placed in contact with a preform disposed on a tool (e.g., a molding tool) in a layup. During the resin-infusion process, the caul plate is exposed to pressure generated by a vacuum. The caul plate transmits the pressure to the resin-infused preform to provide a smooth surface finish for the cured laminate. For instance, the caul plate prevents processing components such as heater wires from inadvertently making impressions in the laminate.

Known caul plates are flexible, semi-flexible, or rigid structures (e.g., aluminum) that float or sit on top of a preform that is to be infused with resin. After the curing of the resin-infused preform is complete, a final position of the caul plate relative to the tool and, thus, a thickness of the laminate, is based on the pressure applied by the vacuum. Thus, while known caul plates may help smooth variations in thickness of the laminate as part of the surface finishing function of the caul plates, known caul plates do not set or control the thickness of the laminate.

Disclosed herein are example caul plates that include indexing features that control a thickness of a resin-infused composite structure such as a laminate, thereby limiting the thickness of the laminate while providing for a smooth surface finish of the laminate. An example caul plate disclosed herein is rigid (e.g., stiff and inflexible) and includes protrusions or feet extending from a surface of the caul plate. During a resin infusion process, the caul plate is placed over the preform. The protrusions extend from the caul plate so that when the caul plate is disposed over the preform, the protrusions contact non-critical areas of the preform, a tool surface on which the preform is disposed, and/or material disposed between the preform and the tool (e.g., vacuum bagging material in examples in which the vacuum bag is coupled to the caul plate) so as not to materially affect the finished composite structure.

In examples disclosed herein, a vacuum bag is placed over the caul plate and preform. In some examples, the vacuum bag is at least partially coupled to the caul plate. Pressure exerted on the caul plate causes compression of the caul plate and, thus, the preform, relative to the tool. However, the protrusions of the caul plate limit the amount of compaction of the caul plate and, thus, control a thickness (e.g., a minimum thickness) of the laminate based on the amount by which the protrusions offset the caul plate relative to the tool. Thus, example caul plates disclosed herein control a thickness of the laminate in addition to creating a smooth laminate surface.

Some example caul plates disclosed herein include one or more features in addition to the protrusions. For instance, some example caul plates include perforations or openings defined therein to promote delivery of resin during resin infusion. Some example caul plates disclosed herein include heating elements such as electrical grids coupled to a surface of the caul plate to promote efficient distribution of heat to the laminate. Some example caul plates disclosed herein includes means for increasing a rigidity of the caul plate, such as ribs coupled to or integrally formed with the caul plate.

FIG. 1 is an exploded view of an example composite laminate layup 100 for resin infusion. The example layup 100 includes a tool 102 (e.g., a molding tool) having a surface 104. A preform 106, or fiber component that is to be infused with resin, is disposed on the surface 104. As a non-limiting illustrative example, the preform 106 can be used to form a component of an aircraft such as a rib, a skin, a spar, etc.

The example preform 106 is covered by a caul plate 108. The caul plate 108 serves as means for smoothing a surface of a composite structure generated from the resin-infused preform 106 so that the composite structure has a smooth surface (e.g., an aerodynamically smooth surface). In the example of FIG. 1, a vacuum bag 110 is disposed over the preform 106 and the caul plate 108. The vacuum bag 110 at least partially covers one or more of the caul plate 108 and/or the tool 102. In some examples, the vacuum bag 110 fully covers one or more of the caul plate 108 and/or the tool 102. In some examples, the vacuum bag 110 is at least partially coupled to the caul plate 108. In some such examples, at least a portion of the vacuum bagging material may be disposed between the preform 106 and the tool surface 104. The vacuum bag 110 is sealed to the surface 104 of the tool 102 and resin in introduced into the vacuum bag 110 during a resin infusion process, as discussed below. Any of the tool 102, the preform 106, the caul plate 108, and/or the vacuum bag 110 of the example layup 100 of FIG. 1 can have different sizes and/or shapes than illustrated in FIG. 1.

The example caul plate 108 of FIG. 1 has a first surface 112, or a preform-facing surface, and a second surface 114 opposite the first surface 112. One or more protrusions 116 are extend from the first surface 112 of the caul plate 108. As disclosed herein, the protrusion 116 serve as means for controlling a thickness of the resin-infused preform 106 during formation of the laminate or composite structure. As illustrated in FIG. 1, the protrusion(s) 116 can extend along an edge 118 of the first surface 112. In some examples, one or more protrusions 116 extend from the caul plate 108 distal from the edge 118, such as a protrusion 116 disposed proximate to a center of the caul plate 108. Thus, the protrusion(s) 116 act as standoffs or feet extending from the caul plate 108. The example caul plate 108 can have fewer or additional protrusions 116 than shown in FIG. 1. Also, a size, shape, and/or location of the protrusion(s) 116 can differ from the examples shown in FIG. 1.

The example caul plate 108 of FIG. 1 is formed from a stiff or rigid material and can include a carbon composite; a metallic material such as steel or aluminum; or other types of materials. In some examples, the portions of the first surface 112 of the caul plate 108 that do not include the protrusions 116 extending therefrom are smooth to enable the caul plate 108 to provide a smooth finish for the resulting laminate. In some other examples, at least a portion of the first surface 112 defines grooves or channels therein to facilitate the flow of resin. The protrusion(s) 116 can include the same material as the caul plate 108 or different material(s). In some examples, the protrusion(s) 116 are formed separately from the caul plate 108 and coupled to the first surface 112 of the caul plate 108 via one or more mechanical fasteners (e.g., bolts) and/or chemical fasteners. In other examples, the protrusion(s) 116 are formed integrally with the caul plate 108 using, for instance, a mold.

Figure 2:
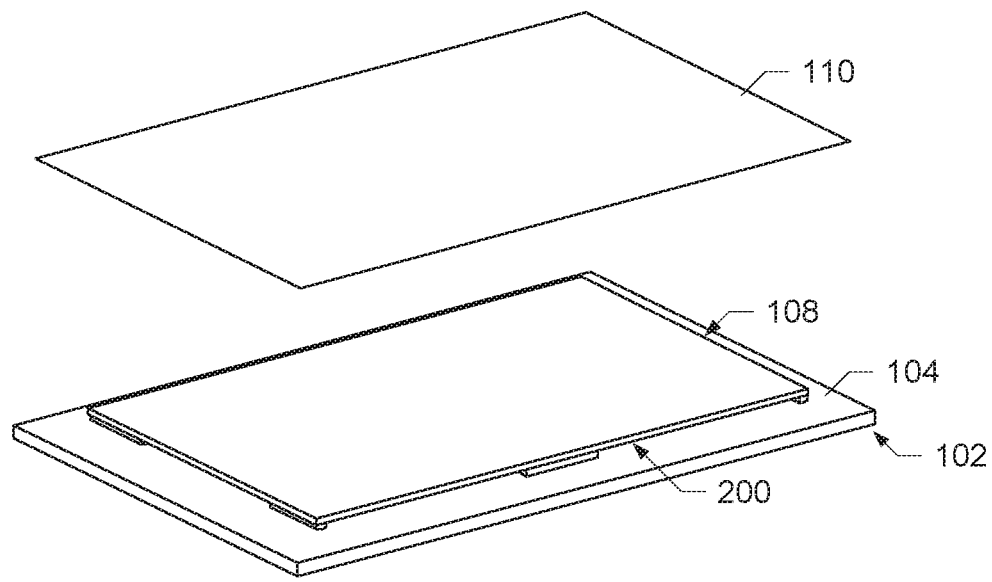
FIG. 2 illustrates a partially assembled view of the example layup of FIG. 1.

FIG. 2 illustrates the example composite laminate layup 100 of FIG. 1 in a partially assembled state in which the preform 106 is disposed over the surface 104 of the tool 102 and covered by the caul plate 108 (and, thus, the preform 106 is not visible in FIG. 2). In some examples, the caul plate 108 is in direct contact with the surface 104 of the tool 102. In other examples, the caul plate 108 is disposed over the tool surface 104 with vacuum bagging material disposed between the caul plate 108 and the tool surface 104 or between the preform 106 and the tool surface 104. As shown in FIG. 2, the protrusions 116 of the caul plate 108 contact or rest on the surface 104 of the tool 102 or material disposed therebetween. Thus, a gap 200 is formed between the surface 104 of the tool 102 and the first surface 112 of the caul plate 108 as a result of the protrusions 116 offsetting the caul plate 108 from the tool surface 104. A height of the gap 200 is defined by a height of the protrusion(s) 116.

In some examples, a size and/or shape of the caul plate 108 and/or a position of the protrusion(s) 116 relative to the caul plate 108 are selected so that the protrusion(s) 116 do not interfere with the preform 106 and/or the tool 102. For example, the protrusion(s) 116 can extend from an edge of the caul plate 108 (e.g., the edge 118) so that when the protrusion(s) 116 rest on the tool surface 104, they are spaced apart from portion(s) of the tool surface 104 including a mold design and/or portion(s) of the tool surface 104 on which the preform 106 rests. As another example, a size and/or a shape of the caul plate 108 can be selected based on the tool 102 and/or the preform 106 so that the protrusion(s) 116 contact non-critical portions of the tool surface 104 or non-critical portions of the preform 106, i.e., portions of the tool surface 104 of the preform 106 in which the protrusion(s) 116 will not materially interfere with the resulting laminate. In some other examples, the tool surface 104 can include indentations, openings, etc. to receive the protrusion(s) 116 of the caul plate 108 at particular locations that do not interfere with the tool 102 and/or the preform 106.

Figure 3:
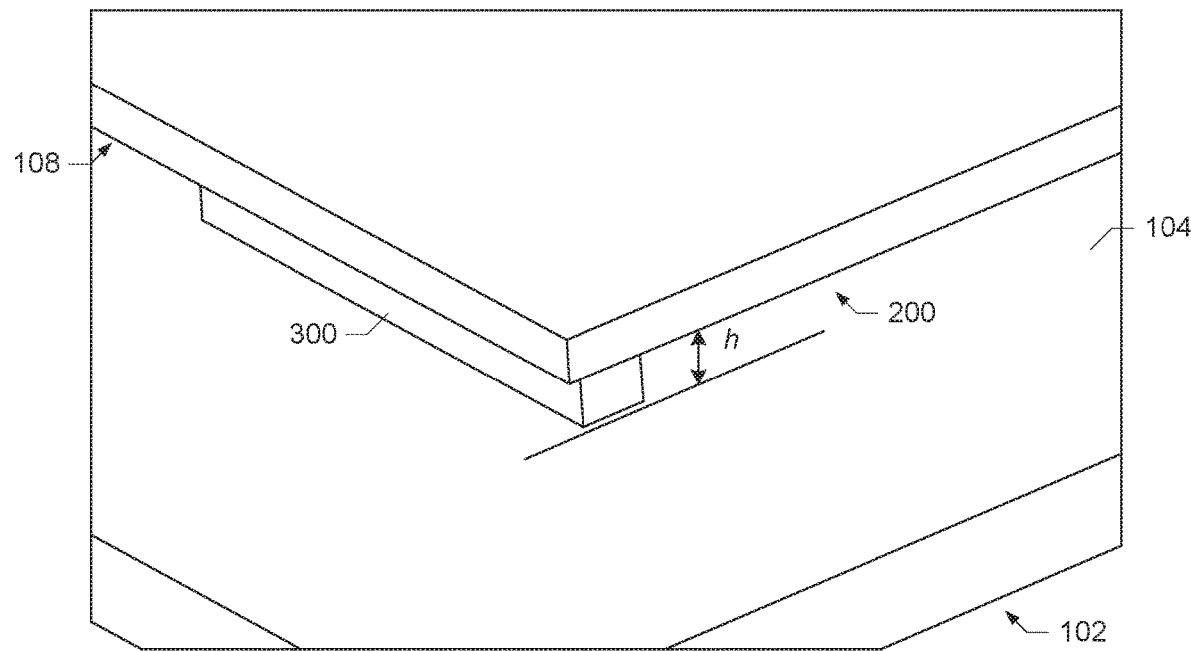
FIG. 3 illustrates a portion of the example layup of FIGS. 1 and 2 and, in particular, illustrates a portion of the caul plate.

In the example composite laminate layup 100 of FIGS. 1 and 2, the height of the gap 200 defines a limit of a thickness (e.g., a minimum thickness) of a laminate formed during curing of the resin-infused preform to form the composite structure. FIG. 3 is a partial view of the example layup 100 in the partially assembled state. In particular, FIG. 3 shows the caul plate 108 having a first protrusion 300 (e.g., one of the protrusion(s) 116 of FIGS. 1 and 2) in contact with the surface 104 of the tool 102. As shown in FIG. 3, a height h of the gap 200 between the tool surface 104 and the caul plate 108 is defined by the first protrusion 300.

Figure 4:
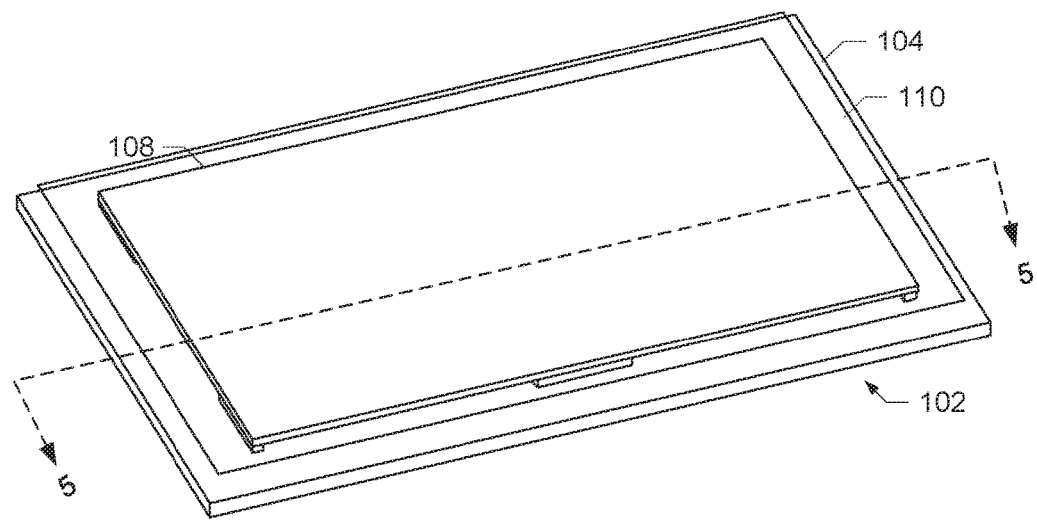
FIG. 4 illustrates an assembled view of the example layup of FIGS. 1-3.

FIG. 4 illustrates the example composite laminate layup 100 in which the vacuum bag 110 is sealingly coupled to the tool surface 104. As shown in FIG. 4, the vacuum bag 110 is disposed over the caul plate 108 and, thus, the preform 106 is located under the caul plate 108.

Figure 5:
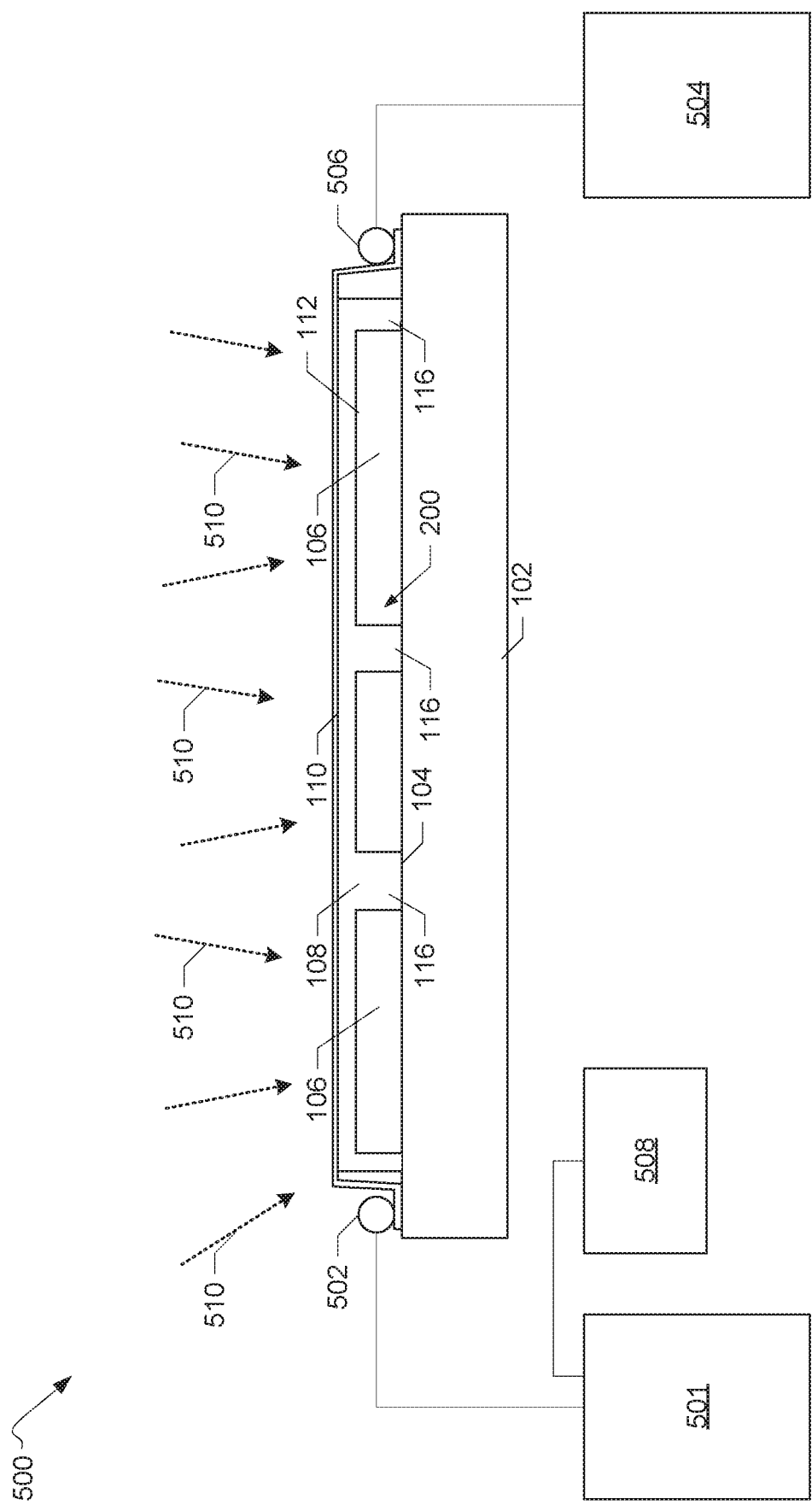
FIG. 5 illustrates an example system for resin infusion including a cross-sectional view of the example layup of FIGS. 1-4 taken along the 5-5 line of FIG. 4.

FIG. 5 illustrates an example system 500 for infusing the preform 106 of the example composite laminate layup 100 of FIGS. 1-4 with resin. For illustrative purposes, FIG. 5 shows a cross-sectional view of the assembled composite laminate layup 100 of FIG. 4 taken along the 5-5 line of FIG. 4.

In the example of FIG. 5, a resin reservoir 501 is coupled to an inlet 502 of the vacuum bag 110. A vacuum pump 504 is coupled to an outlet 506 of the vacuum bag 110. An example resin infusion process that may be implemented by the example system 500 of FIG. 5 including the caul plate 108 having the protrusion 116 is disclosed in U.S. Pat. No. 7,334,782, which is hereby incorporated by reference in its entirety. A vacuum pump 508 coupled to the resin reservoir 501 reduces pressure in the resin reservoir to a vacuum level between 0 and 1 atmosphere. The vacuum pump 504 reduces a pressure at the outlet 506 to a near vacuum level (e.g., 0 inches Hg), thereby creating a driving force between the resin reservoir 501 and the outlet 506. For example, a pressure in the vacuum bag 110 may be 30 inches Hg below atmospheric pressure and a pressure in the resin reservoir 501 may be 15 inches Hg below atmospheric pressure, for a differential pressure at the resin reservoir 501 and outlet 506 having a value of approximately 0.5 atm. Resin from the resin reservoir 501 is pulled into the vacuum bag 110. The resin flows into the preform 106 as the resin flows from the inlet 502 to the outlet 506 (e.g., via one or more plies or other resin flow guide structures having channels or openings to direct the flow).

During resin infusion, a pressure in the vacuum bag 110 increases from vacuum level to approximately the pressure at the inlet 502, for example, 0.5 atm. Also, a pressure difference between atmospheric pressure and the vacuum bag 110, has a value of approximately, for example, 0.5 atm. This net compaction pressure is exerted on the first surface 112 of the caul plate 108, as represented by arrows 510 of FIG. 5. In examples in which the vacuum bag 110 only partially covers the caul plate 108 and is sealed to the caul plate 108, then the pressure differential is measured across the surfaces of the caul plate 108. The net compaction pressure presses the caul plate 108 toward the tool surface 104. However, the protrusions 116 of the caul plate 108 limit the amount of compression of the caul plate 108 relative to the tool surface 104 by maintaining the gap 200 between the caul plate 108 and the tool surface 104. As a result of the maintenance of the predefined offset or gap 200 between the caul plate 108 and the tool surface 104, the protrusions 116 control a thickness of the resin-infused preform 106. In particular, the protrusions 116 set a minimum thickness of the resin-infused preform 106 based on the height of the gap 200 formed between the caul plate 108 and the tool surface 104. Put another way, when the pressure exerted on the caul plate 108 increases, the protrusions 116 prevent further compaction of the caul plate 108 relative to the tool surface 104 and, thus, prevent further minimization or reduction of the thickness of the resin-infused preform 106 by the pressure exerted by the caul plate 108, as compared to a layup that does not include a caul plate including the protrusions 116. Additionally, the portions of the first surface 112 of the caul plate 108 that do not include the protrusions 116 extending therefrom facilitate smoothing of the resin-infused preform to create a composite structure having a smooth surface finish. Thus, the example caul plate 108 provides for laminate thickness control as well as surface finish smoothing.

Figure 6:
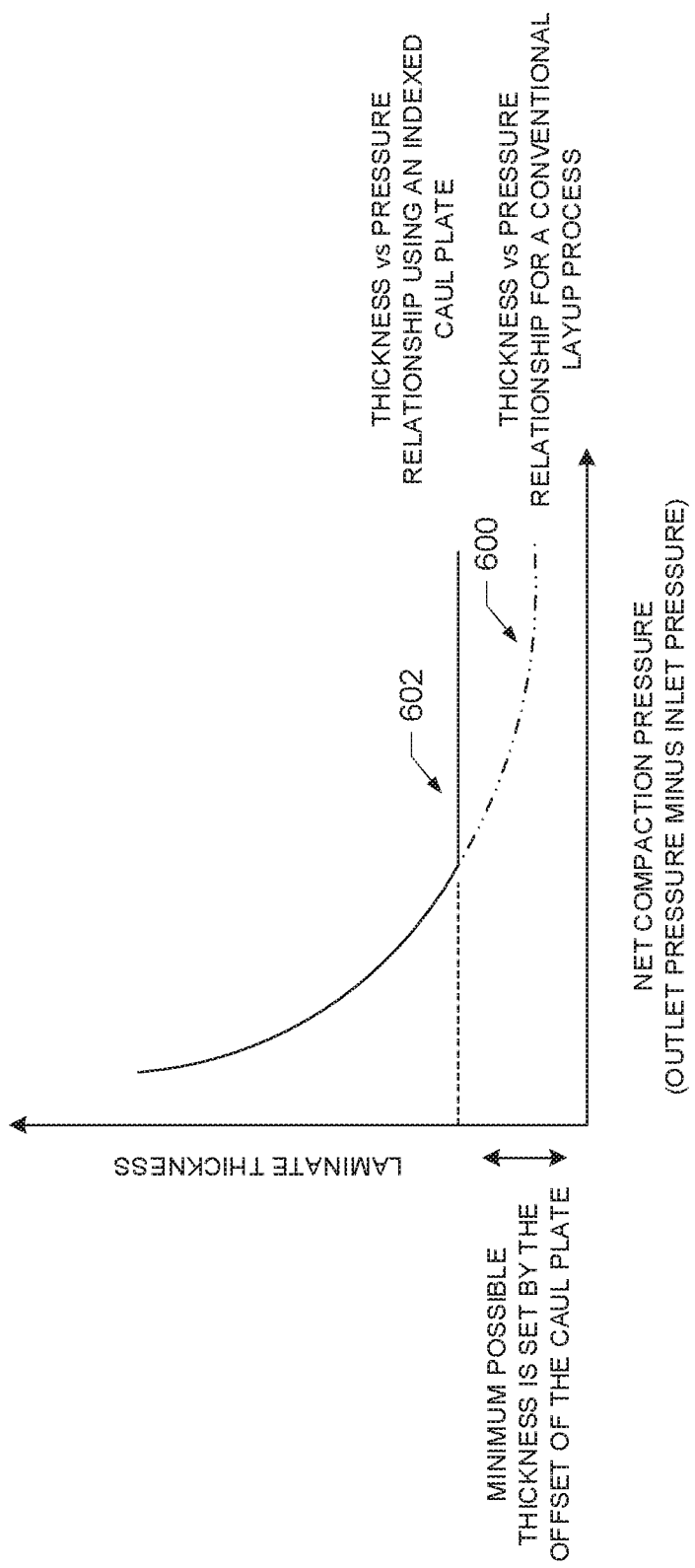
FIG. 6 is an example graph illustrating a relationship between net compaction pressure during a resin infusion process and laminate thickness.

FIG. 6 is a graph of laminate thickness versus net compaction pressure during a resin infusion process for a composite laminate layup including a caul plate having laminate thickness indexing features (e.g., the caul plate 108 of FIGS. 1-5 including the protrusions 116, 300) and for a composite laminate layup that does not include an indexed caul plate. As shown by line 600 in FIG. 6, the laminate thickness for a layup that does not include the indexed caul plate decreases as net compaction pressure increases. In comparison, as shown by line 602 in FIG. 6, the minimum laminate thickness for a layup including the indexed caul plate is controlled as a result of the predefined offset of the caul plate from the tool surface (e.g., the tool surface 104 of FIG. 1) via the protrusions. Put another way, the protrusions prevent further compaction of the caul plate and, thus, prevent further reduction of the preform thickness.

Example indexed caul plates disclosed herein provide for improved thickness tolerance control as compared to examples in which the thickness is not controlled with an indexed caul plate. Indexed caul plates disclosed herein can achieve tighter tolerances with respect to laminate thickness based on the predefined height of the protrusions or feet extending from the caul plate. Further, example caul plates disclosed herein provide for improved repeatability in generating laminates having thicknesses that satisfy particular tolerance ranges based on the known height of the protrusions of the caul plates.

Although the example caul plates disclosed herein are discussed in the context of controlling a minimum thickness of the resin-infused preform, in some examples, the example caul plates can be used to control a maximum thickness of the cured laminate. For instance, referring the example caul plate 108 of FIG. 1, mechanical fasteners (e.g., clamps) can be coupled to the second surface 114 to restrict movement of the caul plate 108 above a certain height (e.g., relative to the vacuum bag).

Figure 7:
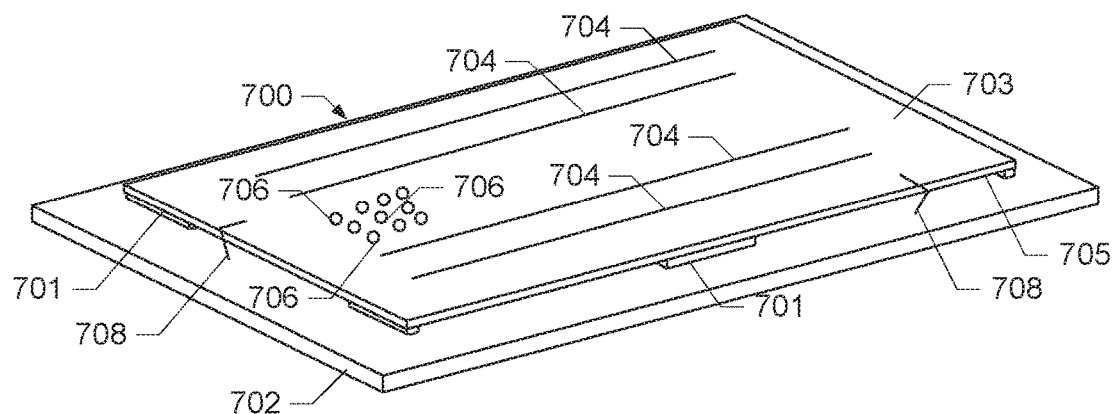
FIG. 7 illustrates an example caul plate in accordance with teachings disclosed herein.

FIG. 7 illustrates an example caul plate 700 having protrusions 701 and including one or more features to increase structural rigidity of the caul plate 700, to facilitate distribution of the resin, and/or to facilitate curing of the laminate. For illustrative purposes, the example caul plate 700 of FIG. 7 is shown disposed on an example tool surface 702. The example caul plate 700 covers a preform (e.g., the preform 106 of FIG. 1).

The example caul plate 700 of FIG. 7 includes one or more ribs 704 to increase rigidity of the caul plate 700 and prevent the caul plate 700 from flexing under pressure. The rib(s) 704 can be made of, for instance, a metal that is less flexible than a metal of which the caul plate 700 is made. The rib(s) 704 can be disposed on one or more surfaces of the caul plate 700, such as a non-preform facing surface 703 as shown FIG. 7 and/or a preform-facing surface 705. In other examples, the rib(s) 704 are integrally formed in the caul plate 700 during manufacturing of the caul plate 700. The example caul plate 700 can include additional or fewer ribs 704 than illustrated in FIG. 7. The rib(s) 704 can have different shapes, sizes, etc. than shown in FIG. 7.

The example caul plate 700 of FIG. 7 includes a plurality of apertures 706 defined therein. During a resin infusion process, resin flows across the caul plate 700. The apertures 706 of the caul plate 700 facilitate delivery of the resin to the preform to improve uniformity in distribution of the resin in the preform, reduce areas that are not infused with resin, etc. The size, shape, and/or spacing of the apertures 706 can differ from the example shown in FIG. 7.

In some examples, the caul plate 700 is coupled to the tool 702 via one or more mechanical fasteners 708. In the example of FIG. 7, the mechanical fasteners 708 include clamps or hooks. The clamps 708 can further serve to stiffen the caul plate 700 and control thickness of the laminate by preventing the caul plate 700 from moving away from (e.g., floating away from) the tool 702 during curing. In some examples, the caul plate 700 is coupled to the tool 702 after resin is infused into the preform so as not to pre-compress the preform, which may hinder the infusion of resin in the preform.

For illustrative purposes, the example caul plate 700 of FIG. 7 is shown as having the ribs 704, the apertures 706, and the fasteners 708. However, in some examples, the caul plate 700 only includes one of the features 704, 706, 708, such as the apertures 706. In some other examples, the caul plate 700 includes two or more of the features 704, 706, 708, such as the ribs 704 and the fasteners 708, each of which can serve as means for increasing a rigidity of the caul plate 700.

Figure 8:
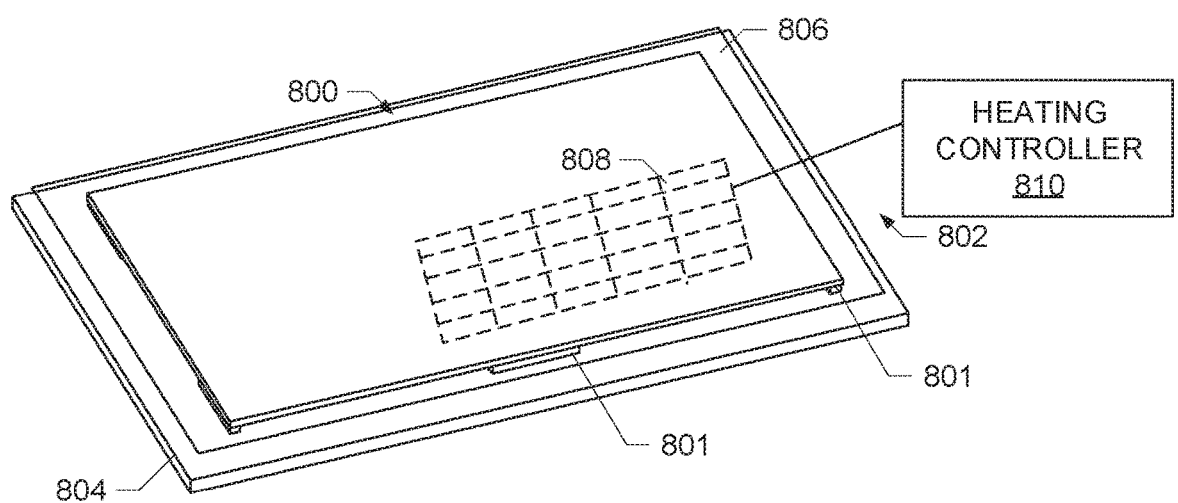
FIG. 8 illustrates another example caul plate in accordance with teachings disclosed herein.

FIG. 8 illustrates another example caul plate 800 having protrusions 801 and including a heater 802 operatively coupled thereto to promote curing of the laminate. For illustrative purposes, the example caul plate 800 of FIG. 8 is shown disposed on an example tool surface 804 and underneath a vacuum bag 806. The example caul plate 800 covers a preform (e.g., the preform 106 of FIG. 1).

The heater 802 of the example caul plate 800 of FIG. 8 includes an electrical grid 808 coupled to the caul plate 800. The electrical grid 808 is operatively coupled to a heating controller 810. When activated via the heating controller 810, the electrical grid 808 generates heat that is transferred to the resin-infused preform via the caul plate 800. The heated caul plate 800 can facilitate curing of the resin to form the laminate. Incorporating the heater 802 into the caul plate 800 improves distribution of heat to the resin-infused preform and/or provides for faster heating cycle rates, thereby increasing efficiency of the curing process. The example caul plate 800 of FIG. 8 can also include one or more features disclosed in connection with the example caul plate 700 of FIG. 7, such as the ribs 704 or the fasteners 708. In some examples, the heater 802 can be used to facilitate or promote curing of a local portion of the resin. In some such examples, the heated caul plate can be placed in an oven or autoclave as part of the overall curing process.

Figure 9:
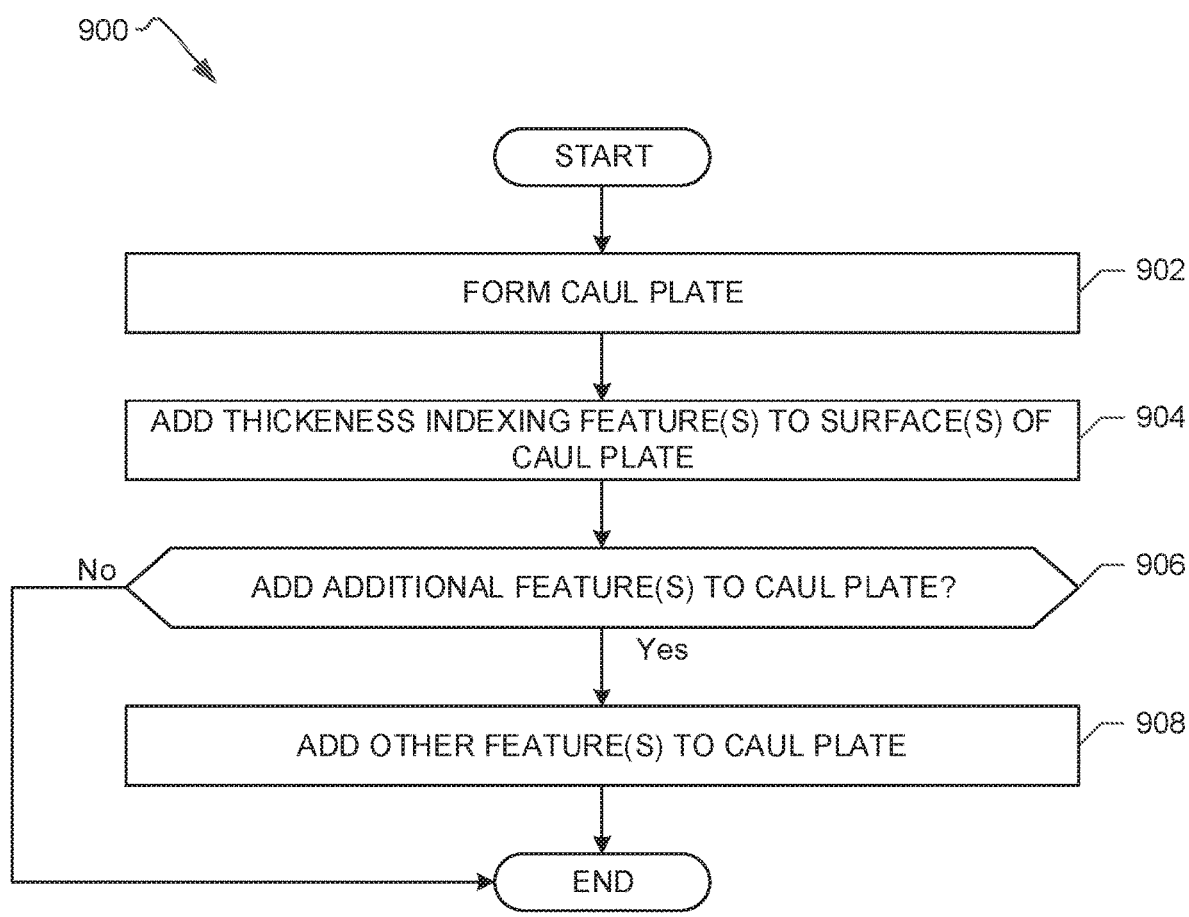
FIG. 9 is a flowchart of example method to manufacture a caul plate having laminate thickness indexing features in accordance with teachings disclosed herein.

FIG. 9 is a flowchart of an example method 900 for manufacturing a caul plate having laminate thickness indexing features (e.g., the example caul plates 108, 700, 800 of FIGS. 1-5, 7, and/or 8 including the protrusions 116, 300, 701, 801) in accordance with teachings of this disclosure. The example method 900 includes forming a caul plate (block 902). The caul plate can be formed from a carbon composite; a metallic material such as aluminum, stainless steel, etc.; or other types of materials. A shape and/or size of the caul plate 108, 700, 800 can be based on, for instance, a size and/or shape of the preform 106 and/or the tool 102.

The example method 900 includes adding thickness indexing feature(s) to one or more surfaces of the caul plate (block 904). For example, the protrusions or feet 116, 300, 701, 801 of FIGS. 1 and 3 can be coupled to the first surface 112 of the caul plate 108, 700, 800 (e.g., a surface that is to face the preform 106 when the caul plate is used in a composite laminate layup) via mechanical and/or chemical fasteners such that the protrusions 116, 300, 701, 801 extend from the first surface 112 of the caul plate 108, 700, 800. In some examples, the protrusions 116, 300, 701, 801 are coupled to the second surface 114 opposite the first surface 112 of the caul plate 108, 700, 800. The protrusions 116, 300, 701, 801 can be coupled to an edge 118 of the caul plate 108, 700, 800 and/or other portions of the caul plate 108, 700, 800 (e.g., portions distal from the edge 118). In some examples, the protrusions 116, 300, 701, 801 are coupled to the caul plate 108, 700, 800 so as not to interfere with portion(s) of the surface 104 of the tool 102, 702, 804 on which the preform 106 is to rest. In some other examples, the protrusions 116, 300, 701, 801 are integrally formed with the caul plate 108, 700, 800 during manufacture of the caul plate.

In the example method 900, if one or more additional features are to be added to the caul plate (block 906), the example method 900 includes adding the additional feature(s) to the caul plate (block 908). For example, the ribs 704 of FIG. 7 can be coupled to or integrally formed with the caul plate 108, 700, 800 to increase a rigidity of the caul plate 108, 700, 800. As another example, the apertures 706 of FIG. 7 can be formed in the caul plate 108, 700, 800 to promote delivery of resin to the preform 106 during a resin infusion process. As another example, a heating element such as the heater 802 of FIG. 8 can be operatively coupled to the caul plate 108, 700, 800 to facilitate distribution of heat to the resin-infused preform 106 during curing.

Although the example method 900 is described with reference to the flowchart illustrated in FIG. 9, many other methods of manufacturing a caul plate having laminate thickness indexing features may alternatively be used. For example, the order of execution of the blocks may be changed, and/or some of the blocks described may be changed, eliminated, or combined. Similarly, additional operations may be included in the example method of FIG. 9 before, in between, or after the blocks shown in FIG. 9.

Figure 10:
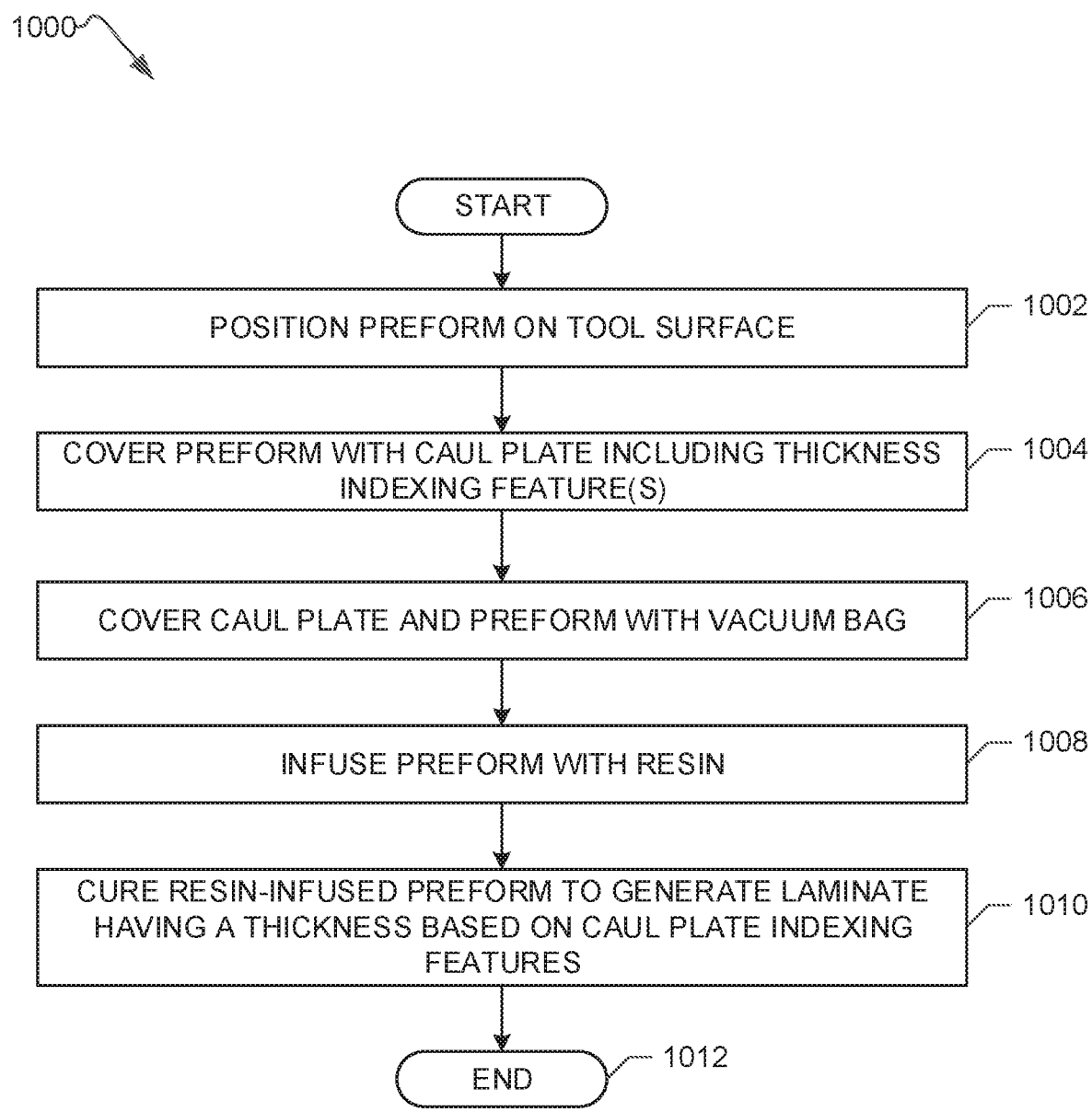
FIG. 10 is a flowchart of example method for performing resin infusion in accordance with teachings disclosed herein.

FIG. 10 is a flowchart of an example method 1000 for performing a resin infusion process using a caul plate having thickness indexing features, such as the example caul plates 108, 700, 800 of FIGS. 1-5, 7, and/or 8 including the protrusions 116, 300, 701, 801. The example method 1000 includes positioning a preform on a surface of a tool, such as a molding tool (block 1002). For example, the preform 106 is positioned on the tool surface 104 of the tool 102 of FIGS. 1-5.

The example method 1000 of FIG. 10 includes covering the preform with a caul plate including thickness indexing feature(s) (block 1004). For example, the caul plate 108, 700, 800 of FIGS. 1-5, 7, and/or 8 including the protrusion(s) 116, 300, 701, 801 is placed over the preform 106 such that the protrusions(s) 116, 300, 701, 801 rest on the tool surface 104. In some examples, the caul plate 108, 700, 800 is coupled to the tool surface via mechanical fastener(s) 708.

The example method 1000 of FIG. 10 includes at least partially covering the caul plate and the preform with a vacuum bag (block 1006). For example, the vacuum bag 110 of FIGS. 1-5 is placed over the caul plate 108, 700, 800 (and, thus, preform 106) and sealingly coupled to a portion of the surface 104 of the tool 102. In some examples, the vacuum bag 110 fully covers one or more of the caul plate 108, 700, 800 and/or the tool 102. In other examples, the vacuum bag 110 partially covers one or more of the caul plate 108 and/or the tool 102 (e.g., when the vacuum bag 110 is sealingly coupled to the caul plate 108).

The example method 1000 includes infusing the preform with resin (block 1008). For example, resin from the resin reservoir 501 of FIG. 5 can be delivered to the example layup 100 including the preform 106 via the inlet 502 of the vacuum bag 110 for infusion into the preform 106. In some examples, the caul plate 108, 700, 800 include apertures 706 to promote delivery of the resin to the preform 106 as the resin flows across the caul plate 108, 700, 800 between the inlet 502 and the outlet 506 of the vacuum bag 110.

As disclosed above, pressure is exerted on the caul plate 108 during the resin infusion process. In the example of FIG. 10, a thickness (e.g., a minimum thickness) of the composite structure formed from the resin-infused preform 106 is controlled based on the protrusions 116, 300, 701, 801 of the caul plate 108, 700, 800, which limit the compaction of the caul plate 108 relative to the tool surface 104 when pressure is exerted on the caul plate 108, 700, 800 during the resin infusion process.

The example method 1000 includes curing the resin-infused preform to generate a laminate having a thickness based on the indexing features of the caul plate (block 1010). For example, the thickness of the laminate can be based on a size of the gap 200 formed between the caul plate 108, 700, 800 and the tool surface 104 as defined by the protrusions 116, 300, 701, 801. The example method 1000 ends when curing of the resin-infused preform is complete (block 1012).

Although the example method 1000 is described with reference to the flowchart illustrated in FIG. 10, many other methods of performing a resin infusion process may alternatively be used. For example, the order of execution of the blocks may be changed, and/or some of the blocks described may be changed, eliminated, or combined. Similarly, additional operations may be included in the example method of FIG. 10 before, in between, or after the blocks shown in FIG. 10.

From the foregoing, it will be appreciated that example caul plates and related methods disclosed herein control a thickness of a resin-infused composite structure in addition to providing a smooth surface finish of the composite structure. Example caul plates disclosed herein include protrusions or feet extending therefrom. The protrusions offset the caul plate from a surface of a tool on which a preform is disposed, thereby defining a gap between the tool and caul plate. The protrusions control the thickness of the resulting cured laminate by limiting the compression of the caul plate when pressure is exerted on the caul plate during the resin infusion process. Example caul plates disclosed herein provide for tighter tolerances with respect to laminate thicknesses and can be used to obtain repeatable results across resin-infused composite structures.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

An example caul plate for use in a composite laminate layup includes a first surface and a second surface opposite the first surface. The example caul plate includes protrusions extending from the first surface. The protrusions are disposed over a tool surface of the composite laminate layup. The protrusions are to define a gap between the first surface and the tool surface to limit a thickness of a preform disposed between the tool surface and the first surface when a pressure is exerted on the second surface.

In some examples, the protrusions extend from an edge of the first surface.

In some examples, the caul plate further includes ribs on one or more of the first surface or the second surface.

In some examples, the caul plate further includes apertures defined in the first surface and the second surface.

In some examples, the caul plate further includes a heater operatively coupled to the caul plate.

In some examples, the protrusions are coupled to the caul plate via mechanical fasteners.

In some examples, the portions of the first surface not including the protrusions are smooth.

An example apparatus disclosed herein includes a tool, a preform to be infused with resin, and a caul plate. The caul plate includes protrusions. The protrusions are disposed over a surface of tool when the caul plate is disposed over the preform. The example apparatus includes a vacuum bag having an inlet and an outlet. The vacuum bag is to be at least partially disposed over the caul plate and the preform. The protrusions of the caul plate are to control a thickness of the preform when a pressure generated between the inlet and the outlet is exerted on the caul plate during infusion of the resin into the preform.

In some examples, the apparatus further includes one or more clamps to couple the caul plate to the tool.

In some examples, the protrusions define a gap between the caul plate and the tool. In such examples, the thickness of the preform to be based on a size of the gap.

In some examples, the apparatus further includes a heater operatively coupled to the caul plate. The heater is to facilitate curing of the resin infused in the preform.

In some examples, the caul plate defines openings therein to direct the resin to the preform.

In some examples, the protrusions are coupled to a surface of the caul plate that is to face the preform when the caul plate is disposed over the preform.

In some examples, the protrusions are to engage a first portion of the tool and the preform is to engage a second portion of the tool different from the first portion.

In some examples, the apparatus further includes ribs on the caul plate.

Another example apparatus disclosed herein a composite structure. The example apparatus includes means for smoothing a surface of the composite structure and means for controlling a thickness of the composite structure extending from the means for smoothing. The means for controlling is to control the thickness of the composite structure when a pressure is exerted on the means for smoothing.

In some examples, the means for controlling the thickness includes protrusions extending from the means for smoothing.

In some examples, the apparatus further includes means for increasing rigidity coupled to the means for smoothing. In some such examples, the means for increasing rigidity includes ribs.

In some examples, the apparatus further includes means for heating operatively coupled to the means for smoothing.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A caul plate for use in a composite laminate layup, the caul plate comprising:
   a first surface;
   a second surface opposite the first surface;
   protrusions extending from the first surface, the protrusions disposed a tool surface of the composite laminate layup, the protrusions to define a gap between the first surface and the tool surface to control a thickness of a preform disposed between the tool surface and the first surface when a pressure is exerted on the second surface; and
   an electrical grid to generate heat to be transferred to the preform.

2. The caul plate of claim 1, wherein the protrusions extend from an edge of the first surface.

3. The caul plate of claim 1, further including ribs on one or more of the first surface or the second surface.

4. The caul plate of claim 1, further including apertures defined in the first surface and the second surface.

5. The caul plate of claim 1, wherein the protrusions are coupled to the caul plate via mechanical fasteners.

6. The caul plate of claim 1, wherein portions of the first surface not including the protrusions are smooth.

7. The caul plate of claim 1, wherein the electrical grid is operatively coupled to a heating controller to control the generation of the heat.

8. An apparatus including:
   a tool;
   a preform to be infused with resin;
   a caul plate, the caul plate including:
      protrusions, the protrusions disposed over a surface of tool when the caul plate is disposed over the preform; and
      an electrical grid to generate heat to be transferred to the preform; and
   a vacuum bag having an inlet and an outlet, the vacuum bag to be at least partially disposed over the caul plate and the preform, the protrusions of the caul plate to control a thickness of the preform when a pressure generated between the inlet and the outlet is exerted on the caul plate during infusion of the resin into the preform.

9. The apparatus of claim 8, further including one or more clamps to couple the caul plate to the tool.

10. The apparatus of claim 8, wherein the protrusions define a gap between the caul plate and the tool, the thickness of the preform to be based on a size of the gap.

11. The apparatus of claim 8, wherein the caul plate defines openings therein to direct the resin to the preform.

12. The apparatus of claim 8, wherein the protrusions are coupled to a surface of the caul plate that is to face the preform when the caul plate is disposed over the preform.

13. The apparatus of claim 8, wherein the protrusions are to engage a first portion of the tool and the preform is to engage a second portion of the tool different from the first portion.

14. The apparatus of claim 8, further including ribs on the caul plate.

15. The apparatus of claim 8, wherein the electrical grid is operatively coupled to a heating controller to control the generation of the heat.

16. An apparatus comprising:
   a composite structure;
   means for smoothing a surface of the composite structure;
   means for heating coupled to the means for smoothing; and
   means for controlling a thickness of the composite structure extending from the means for smoothing, the means for controlling to control the thickness of the composite structure when a pressure is exerted on the means for smoothing.

17. The apparatus of claim 16, wherein the means for controlling the thickness includes protrusions extending from the means for smoothing.

18. The apparatus of claim 16, further including means for increasing rigidity coupled to the means for smoothing.

19. The apparatus of claim 18, wherein the means for increasing rigidity includes ribs.

20. The apparatus of claim 16, wherein the means for heating includes an electrical grid.

\* \* \* \* \*